US006199573B1

(12) United States Patent
Paskiewicz

(10) Patent No.: US 6,199,573 B1
(45) Date of Patent: Mar. 13, 2001

(54) GAS FLOW ARRESTOR

(75) Inventor: Ronald Paskiewicz, Hamburg, NY (US)

(73) Assignee: Craft-Weld Enterprises, Inc., Hamburg, NY (US)

( * ) Notice: Subject to any disclaimer, the term of this patent is extended or adjusted under 35 U.S.C. 154(b) by 0 days.

(21) Appl. No.: 09/315,635

(22) Filed: May 20, 1999

Related U.S. Application Data

(60) Provisional application No. 60/099,542, filed on Sep. 9, 1998.

(51) Int. Cl.[7] .................. F16K 17/38

(52) U.S. Cl. .................. 137/79; 137/78.4; 137/78.5; 137/552; 137/357

(58) Field of Search .................. 137/78.5, 78.4, 137/79, 357, 552

(56) References Cited

U.S. PATENT DOCUMENTS

| | | | | |
|---|---|---|---|---|
| 1,072,938 | * | 9/1913 | Gillen | 137/79 |
| 3,858,601 | | 1/1975 | Ensinger | 137/374 |
| 3,955,186 | * | 5/1976 | Green et al. | 137/78.5 |
| 4,275,754 | | 6/1981 | Lyons et al. | 137/75 |
| 4,308,911 | | 1/1982 | Mandl | 165/22 |
| 4,422,503 | | 12/1983 | Goans | 166/53 |
| 4,488,566 | | 12/1984 | Hicks | 137/74 |
| 4,911,194 | | 3/1990 | Lechner | 137/75 |
| 4,974,623 | | 12/1990 | Sturgis | 137/74 |
| 5,004,012 | | 4/1991 | Bratten | 137/560 |
| 5,090,436 | * | 2/1992 | Hoch, Jr. et al. | 137/80 |
| 5,126,934 | | 6/1992 | MacFadyen | 264/140 |
| 5,240,028 | * | 8/1993 | Hoch, Jr. et al. | 137/80 |
| 5,379,794 | | 1/1995 | Brown | 137/75 |
| 5,419,358 | * | 5/1995 | Sun | 137/78.4 |
| 5,477,877 | | 12/1995 | Schulze et al. | 137/72 |
| 5,568,825 | * | 10/1996 | Faulk | 137/624.11 |
| 5,586,722 | | 12/1996 | Murray | 236/93 B |
| 5,655,561 | * | 8/1997 | Wendel et al. | 137/79 |
| 5,694,960 | | 12/1997 | Turk et al. | 137/1 |
| 5,838,258 | * | 11/1998 | Saar | 137/552 |
| 5,908,980 | * | 6/1999 | Hwang et al. | 73/40 |

* cited by examiner

*Primary Examiner*—A. Michael Chambers

(57) ABSTRACT

A device and method for shutting off the flow of gas to a structure, such as a residence, when a fire is detected in the structure. The device has a fire detector for providing a status signal to indicate the presence of fire in a structure, an actuator in communication with the fire detector, and a shut-off valve located on a gas line and connected to the actuator. When the status signal is received by the actuator, the actuator causes the valve to close, thereby shutting off the flow of gas to the structure. The device also includes one or more of the following: a secondary electric power source, disturbance prevention circuitry, a shut-off valve position indicator, a manually operated means of closing the shut-off valve, and an alarm indicator for indicating the presence of fire in the structure. The method involves detecting a fire and providing a status signal to an actuator. Then the actuator moves the shut-off valve from an open position to a closed position. The method also involves providing an indication of the shut-off valve position.

19 Claims, 2 Drawing Sheets

GAS FLOW ARRESTOR

CROSS-REFERENCE TO RELATED APPLICATION

This application claims priority to an earlier filed U.S. provisional patent application, U.S. provisional patent application Ser. No. 60/099,542, which was filed on Sep. 9, 1998, and is incorporated herein by reference.

BACKGROUND OF THE INVENTION

1. Field of the Invention

The present invention relates to a device and method for shutting off the flow of gas to a structure, such as a residence, when a fire is detected in the structure.

2. Description Of The Prior Art

In the prior art automated gas distribution systems for controlling the flow of gas to an appliance are disclosed. It is known to provide a closed loop delivery system in which gas is provided to an appliance only when that appliance sends a valid request for gas to a control/communications subsystem. It is also known to circumvent the closed-loop delivery of gas to the appliance in emergency conditions, such as in a fire or when a gas leak occurs.

Such gas distribution systems have disadvantages. For example, such systems are complex and/or costly. In addition, such systems do not provide means for protecting against failure of the system in the event of a power loss or power disturbance. Furthermore, such systems do not provide a secondary means for shutting off the flow of gas to the structure in the event that the automatic system fails. Finally, such systems do not provide an indication of the position of the shut-off valve for verifying whether gas is flowing to the structure.

SUMMARY OF THE INVENTION

The present invention provides a shut-off device and a method for shutting off the flow of gas to a structure, such as a residence, when a fire is detected in the structure. An object of the present invention is to provide such a shut-off device and a method which is less complex than shut-off systems disclosed in the prior art.

Furthermore, it is an object of the present invention to provide a means for alerting those near the structure and/or emergency personnel that a fire has been detected and that the gas has been shut off.

In addition, it is an object of the present invention to provide a gas shut-off device and a method which includes means for keeping the shut-off device operating in the event of a power loss or power disturbance.

Furthermore, it is an object of the present invention to provide an automatic gas shut-off device which includes a manually operated means for shutting off the flow of gas to the structure in the event that the automatic system fails.

Finally, it is an object of the present invention to provide a gas shut-off device and method which provides an indication of the position of the shut-off valve for verifying whether gas is flowing to the structure.

Accordingly, a device according to the present invention is an automatic gas shut-off device which includes a fire detector for providing a status signal to indicate the presence of fire in a structure, such as a residence. The shut-off device of the present invention also includes an actuator in communication with the fire detector, and a shut-off valve located on a gas line and connected to the actuator. When the status signal is received by the actuator, the actuator causes the valve to close, thereby shutting off the flow of gas to the structure. The fire detector may send the status signal when it senses smoke or when it senses a temperature in excess of a threshold temperature. The actuator may include a solenoid or a motor for automatically moving the shut-off valve, and also may include a means for manually operating the shut-off valve.

In an embodiment of the present invention, the gas shut-off device includes an electricity supply line connected from a primary electric power source, such as a power supply line of a public utility power plant, to the fire detector or both the fire detector and the actuator. The electricity supply line provides electricity to the fire detector, or both the fire detector and the actuator. Furthermore, the present invention may include a secondary electric power source, such as a battery, connected to the electricity supply line for providing electricity in the event that the primary electric power source fails to provide electricity. In an alternative embodiment of the present invention, disturbance prevention circuitry may be connected to the electricity supply line for preventing disturbances in the electricity provided by the primary electric power source from causing the gas shut-off device to fail to detect the presence of fire and/or close the shut-off valve.

Furthermore, the present invention may have a position indicator for indicating the position of the shut-off valve. The position indicator may use a light or may use a sound generator to indicate the shut-off valve position.

Finally, the present invention may have an alarm indicator which is in communication with the fire detector for receiving the status signal. Upon receiving the status signal, the alarm indicator indicates receipt of the status signal. The alarm indicator may indicate receipt of the status signal via a light or via a sound generator.

In the method of the present invention, fire is detected, a status signal indicating a presence of fire is provided to an actuator which then moves the shut-off valve from an open position to a closed position to prevent gas from flowing through the gas line. The method of the present invention also includes providing an indication of the position of the shut-off valve.

DETAILED DESCRIPTION OF THE PREFERRED EMBODIMENT

Figure 1:
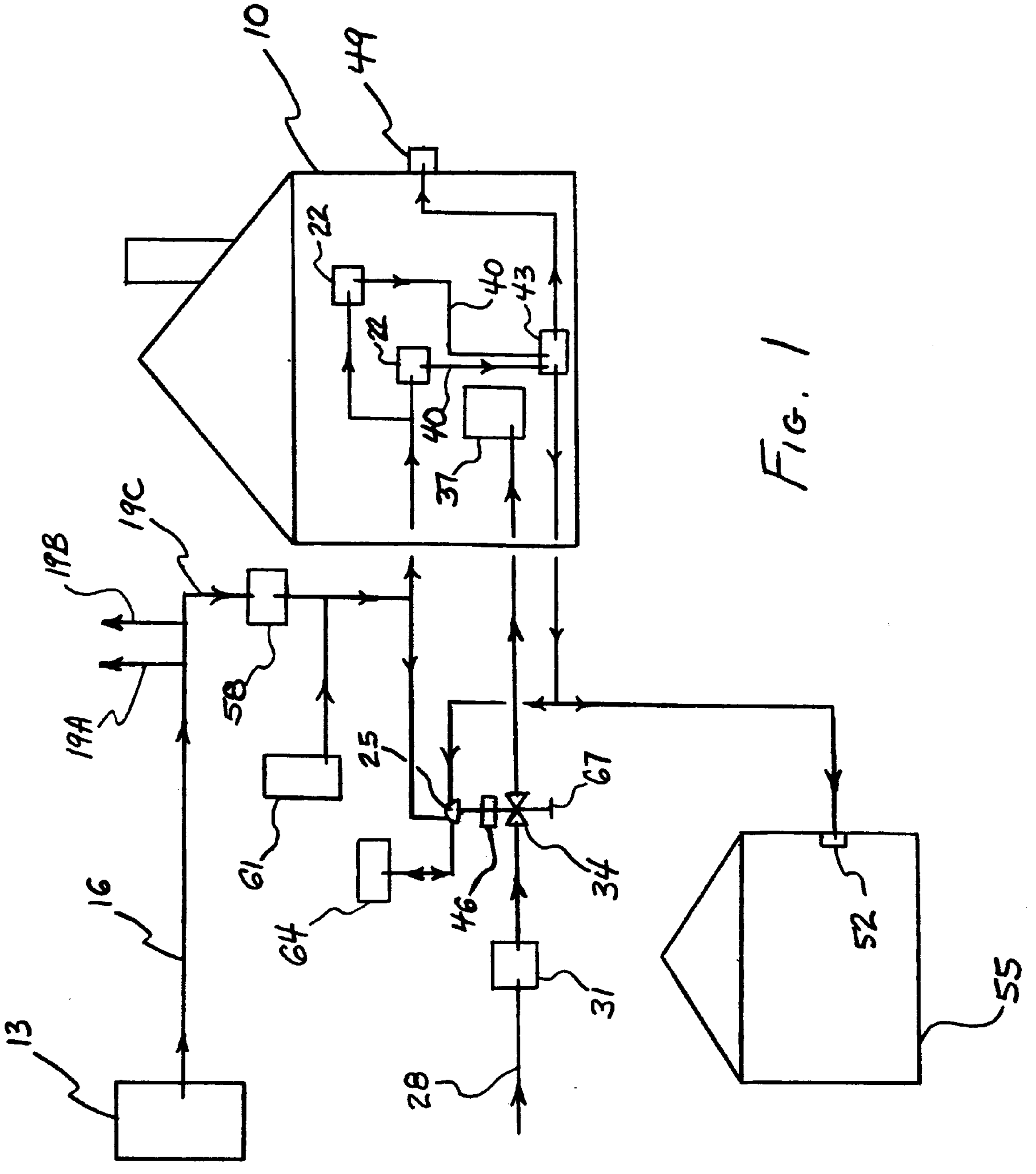
FIG. 1 is a schematic of a device according to the present invention.

A device according to the present invention, illustrated in FIG. 1, shuts off the flow of gas to a structure 10, such as a residence, when a fire is detected in the structure 10. In a preferred embodiment, a primary electric power source 13, such as a public utility, provides electricity via a power line 16 to electricity supply lines 19A, 19B, 19C. The electricity supply line 19C provides the electricity from the power line 16 to the structure 10 for use. In the embodiment of the present invention illustrated in FIG. 1, the electricity supply line 19C is connected to one or more fire detectors 22 and may also be connected to an actuator 25, so as to provide electricity to the fire detector 22 and the actuator 25. The electricity supply line 19C may also be connected to other electrical devices (not shown), such as lights or heaters.

Also shown in FIG. 1 is a gas line 28, which provides gas, such as natural gas, via a gas meter 31 and a shut-off valve 34 to an appliance 37, such as an oven, stove, furnace, or water heater, located in the structure 10.

Figure 2:
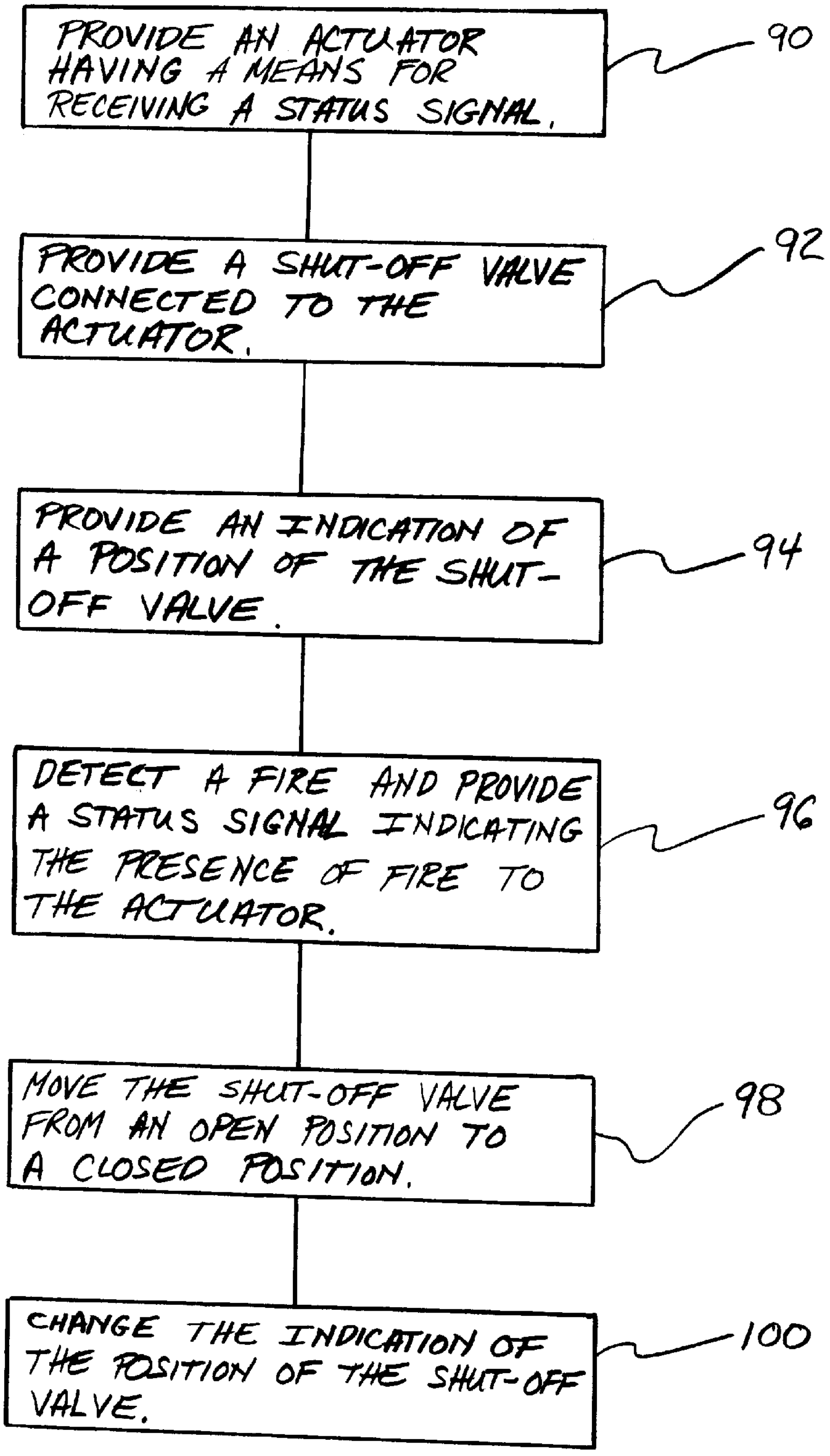
FIG. 2 shows the steps of a method according to the present invention.

The steps of a method according to the present invention are illustrated in FIG. 2 and are further described below in conjunction with the device illustrated in FIG. 1. After providing an actuator (step 90) and providing a shut-off valve (step 92), as described above, when one or more of the fire detectors 22 detects (step 96) the presence of fire, the fire detector 22 provides a status signal along a signal line 40 to the actuator 25, and may provide the status signal via a receiver/transmitter 43. The status signal may be provided by the fire detector 22 when the fire detector 22 senses smoke, or when the fire detector 22 senses a temperature above a threshold temperature. The fire detector 22 may be model number 2112/24 AITR available from System Sensor, a division of Pittway, located in St. Charles, Ill. Upon receipt of the status signal, the actuator 25 moves (step 98) the shut-off valve 34 from an open position to a closed position, thereby stopping the flow of gas through the gas line 28 to the structure 10. The actuator 25 may include a means for assisting 46, which assists in moving the shut-off valve 34 from the open position to the closed position. The means for assisting 46 may be a solenoid or a motor.

The receiver/transmitter 43 may send the status signal to a first alarm indicator 49 located on or near the structure 10 for indicating the receipt of the status signal. The receiver/transmitter 43 may also send the status signal to a second alarm indicator 52 located at an office 55 having emergency assistance personnel, such as a fire department or police department. Furthermore, the alarm indicators 49, 52 may include a light and/or a sound generator for indicating the receipt of the status signal to people nearby. The transmitter/receiver 43 may be a fire alarm control panel model MP-12/24 available from FireLite Alarms Incorporated of Northford, Conn.

As shown in FIG. 1, the present invention may include disturbance prevention circuitry 58 connected to the electricity supply line 19C. The disturbance prevention circuitry 58 prevents disturbances, such as power surges or dips, in the electricity provided by the primary electric power source 13 from resulting in the fire detector 22 failing to detect fire and/or from resulting in the shut-off valve 34 failing to close upon receipt of the status signal. The disturbance prevention circuitry 58 may be obtained from Tripp Lite of Chicago, Ill., model number Internet Office 500.

Also shown in FIG. 1 is a secondary electric power source 61 connected to the electricity supply line 19C. The secondary electric power source 61 provides electricity to the electricity supply line 19C in the event that the primary electric power source 13 does not provide electricity. The secondary electric power source 61 may include a battery and may be located inside or outside the structure 10. The secondary electric power source 61 may be obtained from Tripp Lite of Chicago, Ill., model number Internet Office 500.

The present invention may include a position indicator 64 for indicating (see steps 94 and 96) a position of the shut-off valve 34. The position indicator 64 may be a light or sound generator connected to the actuator 25. By providing an indication of the position of the shut-off valve 34, emergency personnel will know whether they should be prepared to contend with gas inside the structure 10.

In order to further assist emergency personnel, the present invention may have a manually operated means 67 for moving the shut-off valve 34 between the open and closed positions. If the actuator 25 fails to close the shut-off valve 34, the manually operated means 67 may be used to stop the flow of gas through the gas line 28 to the structure 10.

It is therefore apparent that the present invention accomplishes the intended objects described above. Although preferred embodiments of the present invention have been described and illustrated herein, the present invention is not limited to such preferred embodiments. In particular, it is intended that the present invention can be used not only in a residence, but also in other structures including those found in industrial and commercial settings. Since various changes could be made without departing from the spirit and scope of the invention, it is intended that the foregoing description shall be interpreted as illustrative, and not interpreted in a limiting sense. Furthermore, it is intended that the present invention shall be limited only by the following claims.

What is claimed is:

1. A method for automatically shutting-off a gas supply line, comprising:

a) providing an actuator having a means for receiving a status signal;

b) providing a shut-off valve located on a gas line and connected to the actuator;

c) providing an indication of a position of the shut-off valve;

d) detecting a fire by means of a fire detector located inside a building structure and providing the status signal indicating a presence of fire to the actuator;

e) moving the shut-off valve from an open position to a closed position; and f) indicating the position of the shut-off valve being in the closed position by an alarm indicator having an input in communication with the fire detector for receiving the status signal, such that when the status signal for the valve being in the closed position is received by the alarm indicator, the alarm indicator indicates receipt of the status signal, wherein the alarm indicator is selected from the group consisting of:

a light located on an outside wall of the building structure, a sound generates located on an outside wall of the building structure, a light located a distance spaced frown but proximate to the building structure, a sound generator located a distance spaced from but proximate to the building structure, and combinations thereof;

such that an innocent observer looking at the building structure is made aware that the fire detector has detected the presence of a fire either in or on the building structure, and wherein the innocent observer is not responsible for reporting the presence of the fire to an authority responsible for extinguishing the fire.

2. The gas shut-off device of claim 1, wherein the secondary electric power source includes a battery.

3. An automatic gas shut-off device, comprising:

a) a fire detector located inside a building structure and having an output for providing a status signal indicating a presence of fire;

b) an actuator having an input in communication with the fire detector output for receiving the status signal;

c) a shut-off valve located on a gas line and connected to the actuator such that when the status signal from the fire detector is received by the actuator, the actuator causes the shut-off valve to move from an open position to a closed position, thereby preventing gas from flowing through the gas line;

d) an electricity supply line connected to a primary electric power source, the electricity supply line being connected to the fire detector for providing electricity to the fire detector; and e) an alarm indicator having an input in communication with the fire detector output for receiving the status signal, such that when the status signal is received by the alarm indicator, the alarm indicator indicates receipt of the status signal, wherein the alarm indicator is selected from the group consisting of:

a light located on an outside wall of the building structures, a sound generator located on an outside wall of the building structure, a light located a distance spaced from but proximate to the building structure, a sound generator located a distance spaced from but proximate to the building structure, and combinations thereof;

such that an innocent observer looking at the building structure is made aware that the fire detector has detected the presence of a fire either in or on the building structure, and wherein the innocent observer is not responsible for reporting the presence of the fire to an authority responsible for extinguishing the fire.

4. The gas shut-off device of claim 3, wherein the fire detector provides the status signal when the fire detector senses smoke.

5. The gas shut-off device of claim 3, wherein the fire detector provides the status signal when the fire detector senses a temperature above a threshold temperature.

6. The gas shut-off device of claim 3, wherein the actuator includes a solenoid.

7. The gas shut-off device of claim 3, wherein the electricity supply line is connected to the actuator for providing electricity to the actuator.

8. The gas shut-off device of claim 3, further comprising disturbance prevention circuitry connected to the electricity supply line for preventing disturbances in the electricity provided by the primary electric power source from causing the gas shut-off device to fail to detect the presence of fire and move the shut-off valve from the open position to the closed position.

9. The gas shut-off device of claim 3 further comprising a position indicator connected to the actuator for indicating a position of the shut-off valve.

10. The gas shut-off device of claim 9, wherein the position indicator includes a light.

11. The gas shut-off device of claim 9, wherein the position indicator includes a sound generator.

12. The gas shut-off device of claim 1, further including a secondary electric power source connected to the electricity supply line for providing electricity to the fire detector in the event that the primary electric power source does not provide electricity to the fire detector.

13. The gas shut-off device of claim 3 wherein the gas line provides gas to a residence and the fire detector, is located in the residence.

14. An automatic gas shut-off device, comprising:

a) a fire detector located inside a building structure and having an output for providing a status signal indicating a presence of fire;

b) an actuator having an input in communication with the fire detector output for receiving the status signal;

c) a shut-off valve located on a gas line and connected to the actuator such that when the status signal from the fire detector is received by the actuator, the actuator causes the shut-off valve to move from an open position to a closed position, thereby preventing gas from flowing through the gas line;

d) the actuator further having a means for manually moving the shut-off valve between the open position and the closed position; and e) an alarm indicator having an input in communication with the fire detector output for receiving the status signal, such that when the status signal is received by the alarm indicator, the alarm indicator indicates receipt of the status signal, wherein the alarm indicator is selected from the group consisting of:

a light located on an outside wall of the building structure, a sound generator located on an outside wall of the building structure, a light located a distance spaced from but proximate to the building structure, a sound generator located a distance spaced from but proximate to the building structure, and combinations thereof;

such that an innocent observer looking at the building structure is made aware that the fire detector has detected the presence of a fire either in or on the building structure, and wherein the innocent observer is not responsible for reporting the presence of the fire to an authority responsible for extinguishing the fire.

15. The gas shut-off device of claim 14 further comprising a position indicator connected to the actuator for indicating a position of the shut-off valve.

16. The gas shut-off device of claim 14 further comprising an electricity supply line connected to the fire detector for providing electricity to the fire detector, and disturbance prevention circuitry connected to the electricity supply line for preventing disturbances in the electricity provided by the electricity supply line from causing the gas shut-off device to fail to detect the presence of fire and move the shut-off valve from the open position to the closed position.

17. An automatic gas shut-off device, comprising:

a) a fire detector located inside a building structure and having an output for providing a status signal indicating a presence of fire;

b) an actuator having an input in communication with the fire detector output for receiving the status signal;

c) a shut-off valve located on a gas line and connected to the actuator such that when the status signal from the fire detector is received by the actuator, the actuator causes the shut-off valve to move from an open position to a closed position, thereby preventing gas from flowing through the gas line;

d) an electricity supply line connected to a primary electric power source, the electricity supply line being connected to the fire detector and the actuator for providing electricity to the fire detector and the actuator; and e) disturbance prevention circuitry connected to the electricity supply line for preventing disturbances in the electricity provided by the primary electric power source from causing the gas shut-off device to fail to detect the presence of fire and move the shut-off valve from the open position to the closed position; and f) an alarm indicator having an input in communication with the fire detector output for receiving the status signal, such that when the status signal is received by the alarm indicator, the alarm indicator indicates receipt of the status signal, wherein the alarm indicator is selected from the group consisting of:

a light located on an outside wall of the building structure, a sound generator located on an outside wall of the building structure, a light located a distance spaced from but proximate to the building structure, a sound generator located a distance spaced from but proximate to the building structure, and combinations thereof;

such that an innocent observer looking at the building structure is made aware that the fire detector has detected the presence of a fire either in or on the building structure, and wherein the innocent observer is not responsible for reporting the presence of the fire to an authority responsible for extinguishing the fire.

18. The gas shut-off device of claim 17 further comprising a position indicator connected to the actuator for indicating a position of the shut-off valve.

19. An automatic gas shut-off device, comprising:

a) a fire detector located inside a building structure and having an output for providing a status signal indicating a presence of fire;

b) an actuator having an input in communication with the fire detector output for receiving the status signal;

c) a shut-off valve located on a gas line and connected to the actuator such that when the status signal from the fire detector is received by the actuator, the actuator causes the shut-off valve to move from an open position to a closed position, thereby preventing gas from flowing through the gas line;

d) a position indicator connected to the actuator for indicating a position of the shut-off valve; and e) an alarm indicator having an input in communication with the fire detector output for receiving the status signal, such that when the status signal is received by the alarm indicator, the alarm indicator indicates receipt of the status signal, wherein the alarm indicator is selected from the ground consisting of:

a light located on an outside wall of the building structure, a sound generator located on an outside wall of the building structure, a light located a distance spaced from but proximate to the building structure, a sound generator located a distance spaced from but proximate to the building structure, and combinations thereof;

such that an innocent observer looking at the building structure is made aware that the fire detector has detected the presence of a fire either in or on the building structure, and wherein the innocent observer is not responsible for reporting the presence of the fire to an authority responsible for extinguishing the fire.

* * * * *